United States Patent
Tan et al.

(10) Patent No.: US 7,773,134 B2
(45) Date of Patent: Aug. 10, 2010

(54) SYSTEM AND METHOD FOR CANCELING DARK PHOTOCURRENT IN A COLOR SENSOR CIRCUIT

(75) Inventors: Boon Keat Tan, Penang (MY); Chi Mun Ho, N. Sembilan (MY); Kevin Len Li Lim, Perak (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1106 days.

(21) Appl. No.: 10/801,204

(22) Filed: Mar. 15, 2004

(65) Prior Publication Data

US 2005/0200732 A1 Sep. 15, 2005

(51) Int. Cl.
*H04N 9/64* (2006.01)
*H04N 5/217* (2006.01)

(52) U.S. Cl. ................... 348/243; 348/241
(58) Field of Classification Search .......... 348/243, 348/272, 280, 301
See application file for complete search history.

(56) References Cited

U.S. PATENT DOCUMENTS

| | | | | |
|---|---|---|---|---|
| 3,737,571 A | * | 6/1973 | Gaebele et al. | 348/243 |
| 5,329,111 A | * | 7/1994 | Sonoda et al. | 250/208.1 |
| 5,502,488 A | * | 3/1996 | Nagasaki et al. | 348/300 |
| 5,508,507 A | * | 4/1996 | Nelson et al. | 250/214 LA |
| 5,633,679 A | * | 5/1997 | Hosier et al. | 348/243 |
| 5,677,940 A | * | 10/1997 | Suzuki et al. | 378/38 |
| 5,757,520 A | * | 5/1998 | Takashima | 358/513 |
| 6,166,831 A | * | 12/2000 | Boyd et al. | 358/483 |
| 6,445,413 B1 | * | 9/2002 | Hosier et al. | 348/245 |
| 6,596,981 B1 | | 7/2003 | Aswell et al. | |

FOREIGN PATENT DOCUMENTS

JP 03-139957 * 6/1991

OTHER PUBLICATIONS

Zhaoxiang, He et al., "An Investigation on the Dark Current in Charge Coupled Linear Imaging Devices", *Published in the proceedings of Huazhong Technical College*, vol. 10, No. 4. Aug. 1982, 41-48.

* cited by examiner

*Primary Examiner*—Luong T Nguyen (57) ABSTRACT

A system and method for canceling dark photocurrent in a color sensor circuit is disclosed. A color sensor is described including a color sensor circuit, a dark color sensor circuit, and a differential amplifier circuit. The color sensor circuit receives photocurrent from a color component of a light input. The color sensor circuit outputs a first voltage indicating intensity of the color component. The dark color sensor circuit receives dark photocurrent and outputs a second voltage indicating an offset voltage. The differential amplifier circuit is coupled to the color sensor circuit and to the dark color sensor circuit. The differential amplifier circuit receives the first and second voltages and outputs a final output that cancels contributions of the offset voltage in the first voltage due to the dark photocurrent.

8 Claims, 8 Drawing Sheets

SYSTEM AND METHOD FOR CANCELING DARK PHOTOCURRENT IN A COLOR SENSOR CIRCUIT

FIELD

The present invention relates to the field of color sensors, and more particularly to a system and method for canceling dark current offset and temperature variation in a color sensor.

BACKGROUND

At the heart of a color sensor is a photodetector. The purpose of the photodetector is to capture and convert electromagnetic radiation into an electronic signal. Typically, the resulting electronic signal is proportional to the incident light intensity. Conventional color sensor circuits employ p-i-n or pn junction photodiodes as the photodetector. In general, a photodiode captures and absorbs light energy. Charge carriers are produced and swept across the p-i-n or pn junctions of the photodiode and produce a small photocurrent, which can be detected. Normally, the photodiodes exhibit a linear response over a large operational range.

In the color sensor, a transimpedance amplifier is used to convert the photocurrent into a voltage signal. The transimpedance amplifier is beneficial as it provides a high effective input impedance to generate a suitable voltage level while maintaining a R-C time constant that is significantly lower than a conventional amplifier with similar input impedance characteristics. Moreover, the transimpedance amplifier also provides a linear response and does not compromise the inherent high linearity of the photodiode.

Figure 1A:
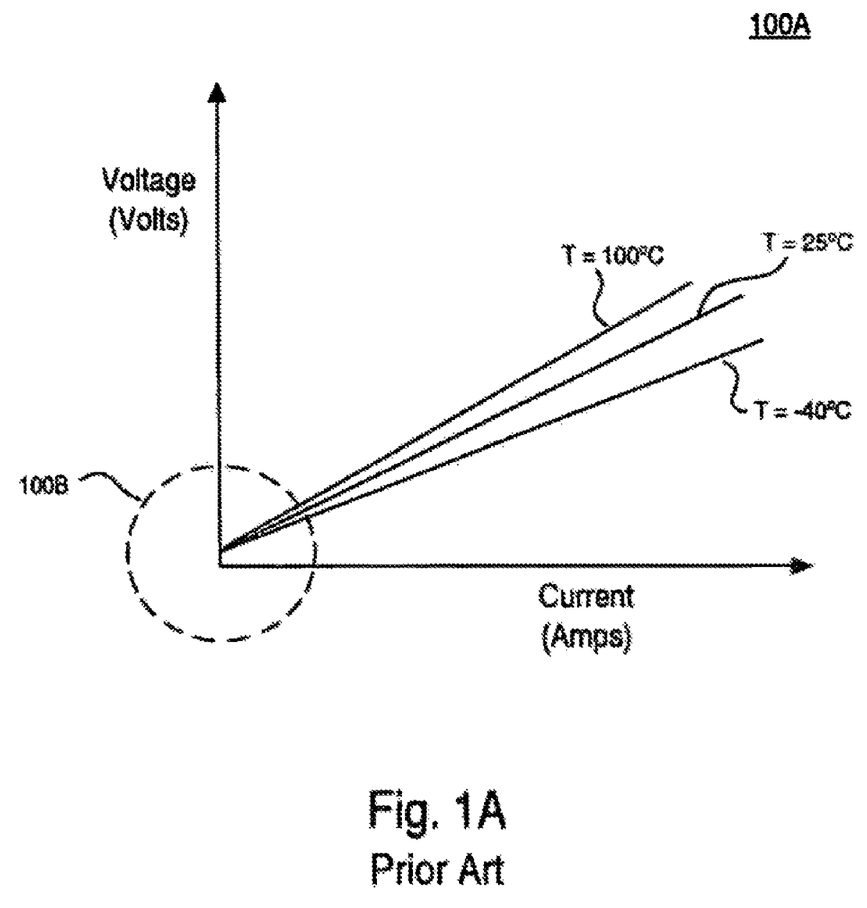
FIG. 1A is a graph illustrating the adverse affects of dark current voltage offset over a temperature range.
Figure 1B:
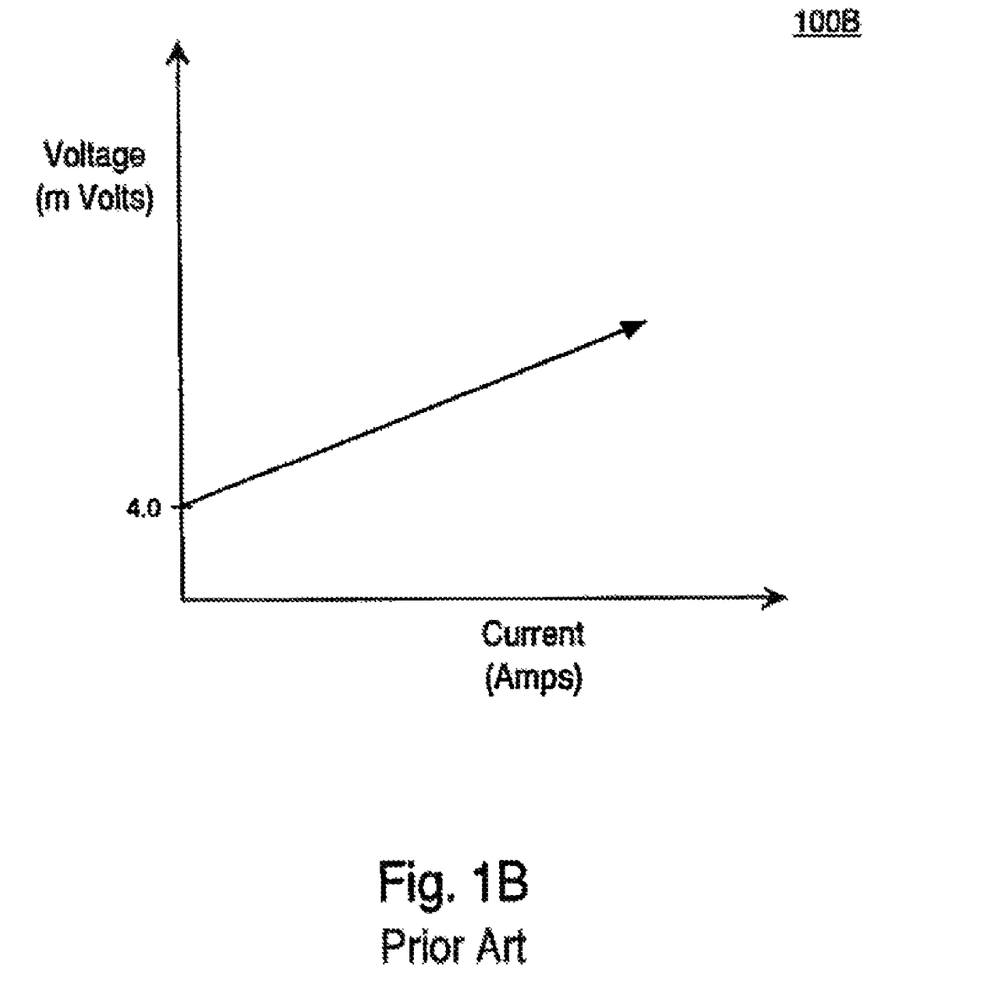
FIG. 1B is a graph illustrating the adverse affects of dark current voltage offset.

However, in the conventional color sensor, problems with dark current null offset and temperature variation occur that adversely affect the voltage response from the transimpedance amplifier of the color sensor. Prior Art FIG. 1A is a graph illustrating the effects of temperature variation and the dark color offset in a color sensor. Prior Art FIG. 1B is a graph illustrating a blown up region 100B of Prior Art FIG. 1A illustrating the dark current null offset.

Specifically, in a color sensor, dark current representing dark light energy contributes a voltage offset. As shown in Prior Art FIG. 1B, the dark current voltage offset is approximately 4 mV at zero amps for the detected photocurrent, in one case. This dark current voltage offset adversely affects the DC response of the color sensor. That is, the dark current voltage offset negatively affects the output voltage from the color sensor to give a false voltage reading corresponding to the intensity of the light energy input.

Moreover, the rate of the dark current voltage offset varies with temperature. Prior Art FIG. 1A is a graph illustrating the effects of the variation of the dark current voltage offset on the voltage response of the transimpedance amplifier of the color sensor. In particular, the dark current offset rate increases with increased temperatures. This change in rate of the dark current voltage offset affects the slope of linearity in the transimpedance amplifier response. That is, the slope of the line indicating operation of the color sensor at T=100 degrees Celsius is greater than the slope of the line indicating operation of the color sensor at T=25 degrees Celsius. Appropriately, the slope of the line indicating operation of the color sensor at T=25 degrees Celsius is greater than the slope of the line indicating operation of the color sensor at T=minus 40 degrees Celsius. As such, the color sensor is sensitive to temperature as the voltage reading from the color sensor does not provide a constant linear response over a range of temperatures, which adversely affects the response of the transimpedance amplifier in the color sensor.

As a result, because conventional color sensor amplifiers exhibit dark current null offset in their voltage outputs, a disadvantage of conventional color sensors is decreased DC response (zero offset) of the color sensor. In addition, another disadvantage is that temperature variation in the voltage response of the transimpedance amplifier of the color sensor contributes to a variation in the slope of the linear response that adversely leads to a variation in the voltage response of the color sensor over a temperature range.

Therefore, prior art systems and methods provide color sensors that are adversely affected by dark current voltage offset and reduced temperature robustness.

SUMMARY

A system and method for canceling dark photocurrent in a color sensor circuit is disclosed. A color sensor is described including a color sensor circuit, a dark color sensor circuit, and a differential amplifier circuit. The color sensor circuit receives photocurrent from a color component of a light input. The color sensor circuit outputs a first voltage indicating intensity of the color component. The dark color sensor circuit receives dark photocurrent and outputs a second voltage indicating an offset voltage. The differential amplifier circuit is coupled to the color sensor circuit and to the dark color sensor circuit. The differential amplifier circuit receives the first and second voltages and outputs a final output that cancels contributions of the offset voltage in the first voltage due to the dark photocurrent.

BRIEF DESCRIPTION OF THE DRAWINGS

Prior Art

Prior Art

DETAILED DESCRIPTION

Accordingly, the present invention discloses a system and method for canceling dark current voltage offset that provides increased temperature robustness. Specifically, embodiments of the present invention are capable of canceling the effect of dark current voltage offset in the voltage outputs of color sensors of respective color components. As a result, embodiments of the present invention provide an improvement over conventional color sensors by exhibiting increased DC response of the color sensor. In addition, as a further benefit with the cancellation of the dark current voltage offset, embodiments of the present invention exhibit increased temperature robustness as the slope of the voltage response of the transimpedance amplifier of the color sensor does not vary with temperature.

Figure 2A:
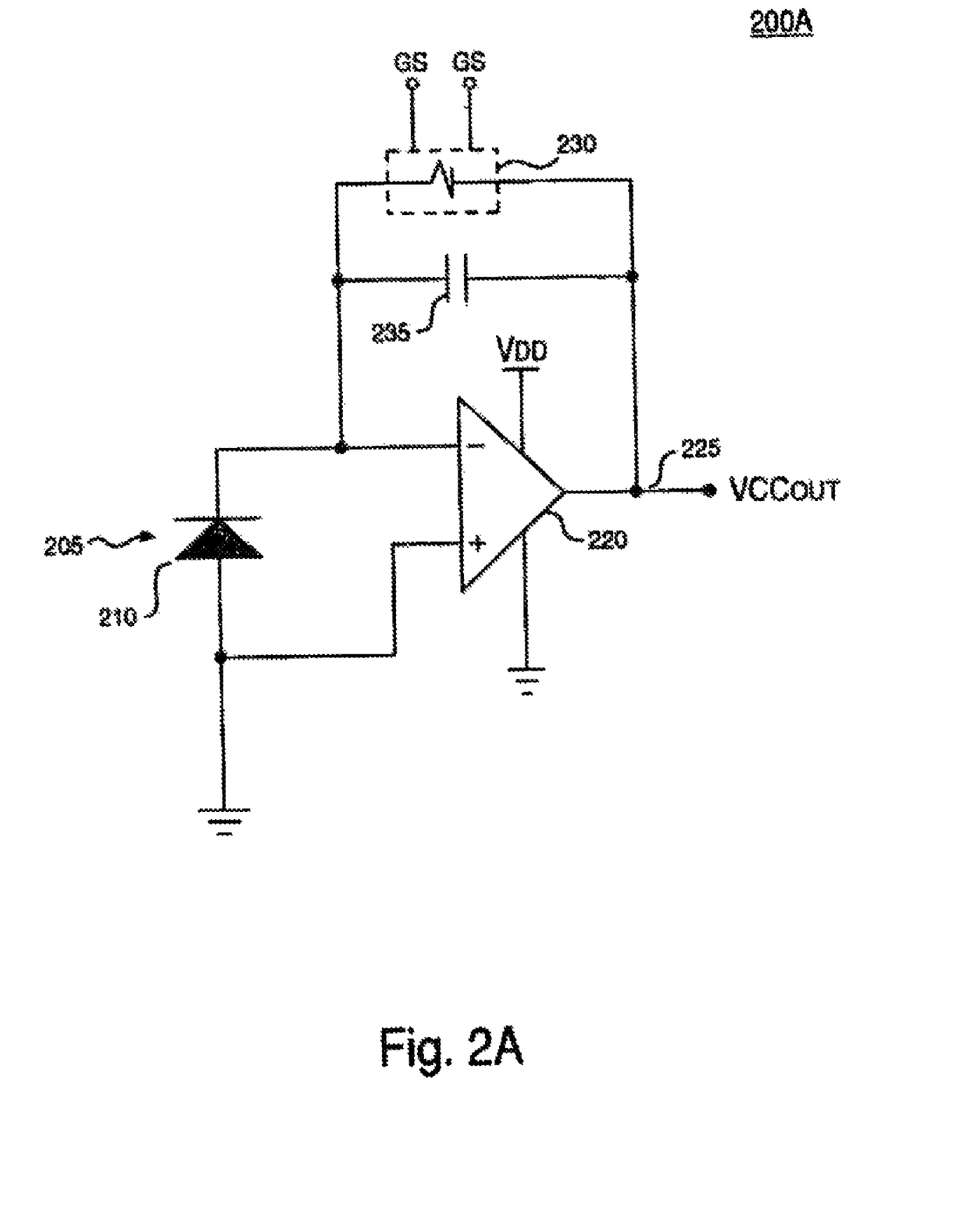
FIG. 2A is a schematic diagram of a color sensor circuit used to capture light energy from a color component, in accordance with one embodiment of the present invention.
Figure 2B:
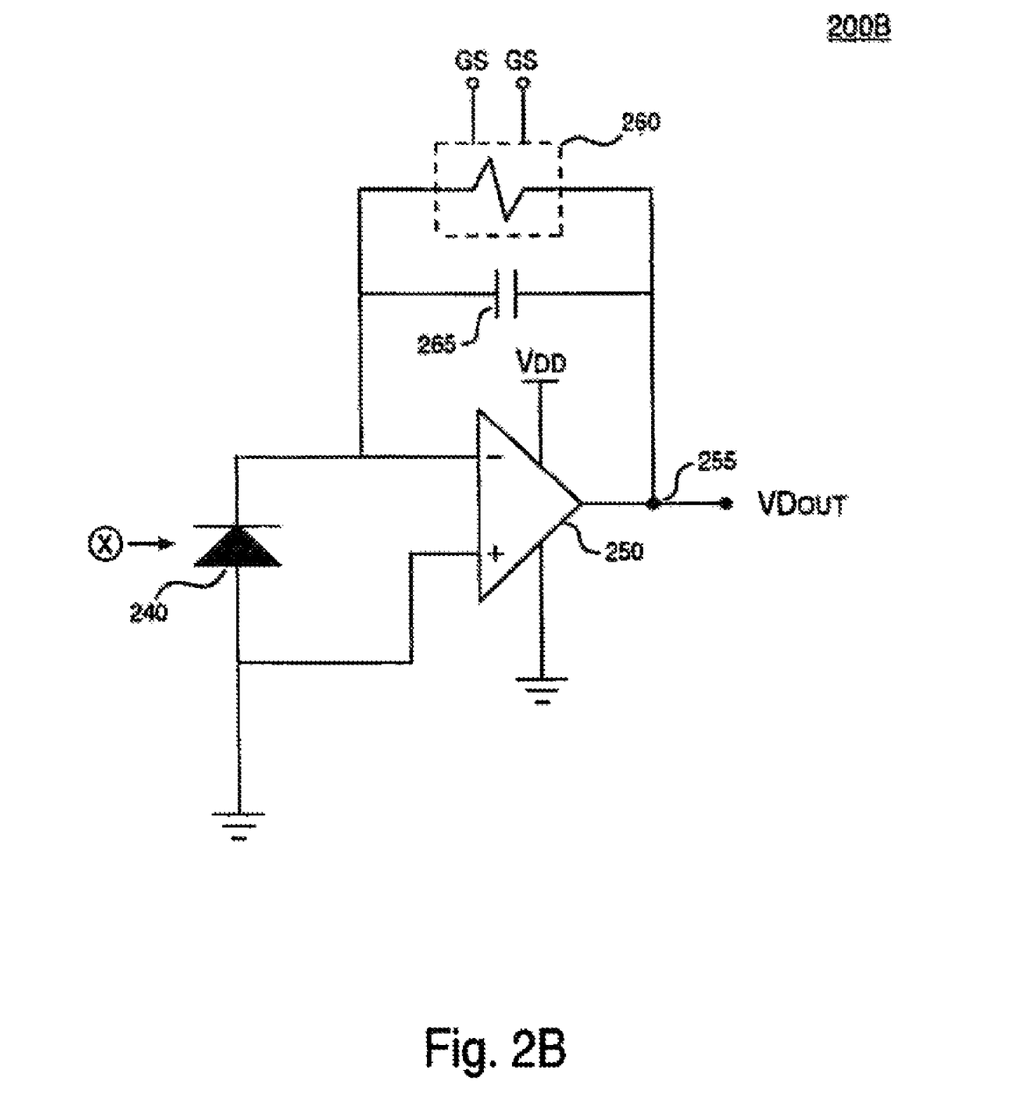
FIG. 2B is a schematic diagram of a dark color sensor circuit used to measure dark current, in accordance with one embodiment of the present invention.
Figure 2C:
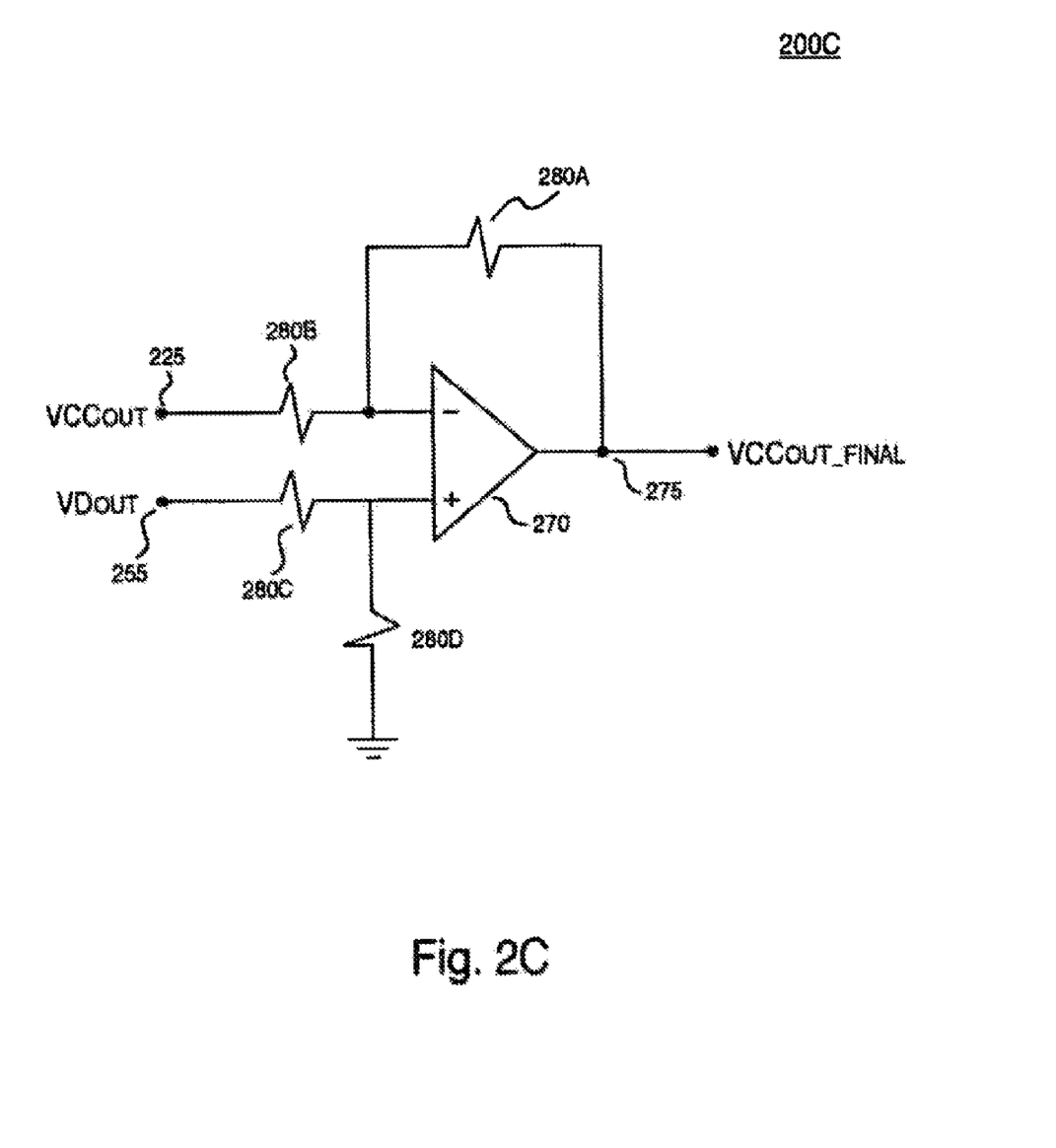
FIG. 2C is a schematic diagram of a differential circuit for canceling dark current voltage offset, in accordance with one embodiment of the present invention.

Now referring to FIGS. 2A, 2B, and 2C, schematic diagrams are disclosed for providing the cancellation of dark current voltage offset in a color sensor, in accordance with embodiments of the present invention. The schematic diagrams in FIGS. 2A, 2B, and 2C overcome the problems associated with dark current voltage offset thus providing better color sensor DC response (zero offset) and increased temperature robustness. The embodiments of the present invention as described in FIGS. 2A, 2B, and 2C are described within the context of a color component. While embodiments of the present invention are described using color components of red, green, and blue, other embodiments of the present invention are well suited to other color components.

FIG. 2A is a schematic diagram of a color sensor circuit 200A that measures photocurrent and resulting output voltage for a color component of input light energy that includes the dark current voltage offset, in accordance with one embodiment of the present invention. The color sensor circuit 200A produces photocurrent from a color component of a light input 205. In embodiments of the present invention, the color components include red, green, and blue. The color sensor circuit 200A outputs a voltage VCCOUT at node 225 that indicates the intensity of the color component of the light input being measured.

The color sensor circuit 200A includes a photodetector 210 (e.g., a photodiode) that captures electromagnetic radiation from the input light energy 205. The photodetector produces a photocurrent from the electromagnetic radiation. The output of the photodetector as the produced photocurrent is sent to the negative input of the transimpedance amplifier 220. The positive input of the transimpedance amplifier 220 is coupled to ground. The transimpedance amplifier 220 is biased by a voltage $V_{DD}$ and ground. In one embodiment, the range of $V_{DD}$ is approximately from 3.3 volts to 5.0 volts. The transimpedance amplifier 220 converts the photocurrent from the photodetector 210 into an output voltage VCCOUT at node 225 that provides an intensity of the respective color component of the input light energy.

The value of the VCCOUT at node 225 is dependant on the gain of the transimpedance amplifier 220. The output voltage VCCOUT is shown in Equation 1, as follows:

$$VCCOUT = A_{TIA}(I_{Color\ Component} + I_{Dark}) \quad (1)$$

The parameter $A_{TIA}$ is the gain of the transimpedance amplifier 220. Also, the $I_{Color\ Component}$ is the current measured from the color component of the input light energy 205. The $I_{Dark}$ is the dark current measured by the color sensor circuit 200A.

As shown in FIG. 200A, the photodetector 210 detects the photocurrent of the respective color component includes a photodetector input coupled to ground and to the positive input of the transimpedance amplifier 220. Also, the photodetector 210 includes a photodetector output coupled to the negative input of the transimpedance amplifier 220.

In addition, the color sensor circuit 200A includes a feedback resistor component 230. The value of the feedback resistor component 230 depends on a variation of parameters, such as color component measured, filter response, photodiode spectral responses, etc. Selection of the feedback resistor component 230 also depends on the required dynamic range of either illuminance (photometric) measurements or irradiance (radiometric) power intensity measurements. In one embodiment, the range of values for the feedback resistor component 230 is from 0.5 megaohms to 200 megaohms.

The feedback resistor component 230 includes a gain select, in accordance with one embodiment of the present invention. These digital input combinations set different resistor values according to user preference. The resistor values are selected depending on the gain required for sensing the color component. Generally, the higher the value of the feedback resistor component, the higher the gain, and thus, the more sensitive the color sensor circuit 200A is to variations in color intensity.

As shown in FIG. 2A, the feedback resistor component 230 includes one end coupled to the output VCCOUT at node 225. In addition, the feedback resistor component 230 includes another end coupled to the negative input of the transimpedance amplifier 220.

The color sensor circuit 200A also includes a compensation capacitor 235. The compensation capacitor 235 stabilizes the overall system performance of the color sensor circuit 200A. Typical values of the compensation capacitor 235 range from approximately 2 picofarads to 400 picofarads. Also, the color component being measured will affect the capacitance needed in the compensation capacitor 235. In general, the higher the resistance of the feedback resistor component 230, the higher the capacitance of the compensation capacitor 235.

As shown in FIG. 2A, the compensation capacitor 235 is coupled in parallel with the feedback resistor component 230 to the output voltage VCCOUT at node 225 and the negative input of the transimpedance amplifier 220.

FIG. 2B is a schematic diagram of a color sensor circuit 200B that measures the dark current voltage offset. The color sensor of FIGS. 2A, 2B, and 2C now incorporates an additional transimpedance amplifier to convert the dark photocurrent as some form of reference cancellation for the voltage output VCCOUT from FIG. 2A. That is, the color sensor circuit 200B measures the photocurrent and resulting output offset voltage for an input light energy that is dark from electromagnetic radiation that is absent, in accordance with one embodiment of the present invention. As such, the color sensor circuit 200 produces a dark photocurrent and outputs a dark current offset voltage VDOUT at node 255 that indicates the intensity of dark current. The configuration of the color sensor circuit 200B is identical to the configuration of the color sensor circuit 200A. However, the color sensor circuit 200A is designed to detect corresponding light energy of a color component of an input light energy, and the color sensor circuit 200B is designed to detect dark photocurrent.

The color sensor circuit 200B includes a photodetector 240 (e.g., a photodiode) to capture electromagnetic radiation. While electromagnetic radiation as an input is absent in FIG. 2B as shown by the circled X, a dark current is present in the color sensor circuit 200B that is detected and measured as an output VDOUT at node 255. The photodetector 240 produces a dark photocurrent. The output of the photodetector as the produced photocurrent is sent to the negative input of the transimpedance amplifier 250. The positive input of the transimpedance amplifier 250 is coupled to ground. The transimpedance amplifier 250 is biased by the supply voltage $V_{DD}$ and ground. The transimpedance amplifier 220 converts the dark photocurrent from the photodetector 240 into an output voltage VDOUT at node 255 that provides the offset voltage of representative color sensor operating under the same conditions, such as color sensor circuit 200A.

The value of the VDOUT at node 255 is dependant on the gain of the transimpedance amplifier 250. The output voltage VDOUT is shown in Equation 2, as follows:

$$VDOUT = A_{TIA}(I_{Dark}) \quad (2)$$

The parameter $A_{TIA}$ is the gain of the transimpedance amplifier 250. The $I_{Dark}$ is the dark current measured by the color sensor circuit 200B.

As shown in FIG. 200B, the photodetector 240 detects the dark photocurrent and includes a photodetector input coupled to ground and to the positive input of the transimpedance amplifier 250. Also, the photodetector 240 includes a photodetector output coupled to the negative input of the transimpedance amplifier 250.

In addition, the color sensor circuit 200B includes a feedback resistor component 260. The value of the feedback resistor component 230 depends on a variation of parameters, such as filter response, photodiode spectral responses, etc. Selection of the feedback resistor component 230 also depends on the required dynamic range of either illuminance (photometric) measurements or irradiance (radiometric) power intensity measurements. In one embodiment, the range of values for the feedback resistor component 230 is from 0.5 megaohms to 200 megaohms.

The feedback resistor component 260 includes a gain select, in accordance with one embodiment of the present invention. These digital input combinations set different resistor values according to user preference. The resistor values are selected depending on the gain required for sensing the dark photocurrent. Generally, the higher the value of the feedback resistor component, the higher the gain, and thus, the color sensor circuit 200B is more sensitive.

As shown in FIG. 2B, the feedback resistor component 260 includes one end coupled to the output VDOUT at node 255. In addition, the feedback resistor component 260 includes another end coupled to the negative input of the transimpedance amplifier 250.

The color sensor circuit 200B also includes a compensation capacitor 265. The compensation capacitor 265 stabilizes the overall system performance of the color sensor circuit 200B. Typical values of the compensation capacitor 235 range from approximately 2 picofarads to 400 picofarads. In general, the higher the resistance of the feedback resistor component 260, the higher the capacitance of the compensation capacitor 265.

As shown in FIG. 2B, the compensation capacitor 265 is coupled in parallel with the feedback resistor component 260 to the output voltage VDOUT at node 255 and the negative input of the transimpedance amplifier 250.

FIG. 2C is a schematic diagram of a differential amplifier circuit 200C that cancels contributions of the dark current offset in the output voltage VCCOUT due to dark photocurrent, in accordance with one embodiment of the present invention. Specifically, the differential amplifier circuit 200C receives the output voltage VCCOUT from the color sensor circuit 200A and the output voltage VDOUT from the color sensor circuit 200B and outputs at output node 275 a final output VCCOUT_FINAL that cancels contributions of the offset voltage due to dark photocurrent.

The differential amplifier circuit 200C includes a difference operational amplifier 270. The difference operational amplifier 270 outputs at node 275 the final output voltage VCCOUT_FINAL of the color component of the input light energy 205 as shown in FIG. 2A that compensates for the dark current voltage offset.

The value of the VCCOUT_FINAL at node 275 is shown in Equation 3, assuming that resistance values for the resistors 280A, 280B, 280C, and 280D are of equal value, as follows:

$$VCCOUT\_FINAL = VCCOUT - VDOUT \quad (3)$$

As such, since the voltage VCCOUT is essentially the voltage gain total of both the dark photocurrent and photocurrent generated by the respective color component of the input light energy 205, the effect of the dark photocurrent is cancelled. As a result, the relative temperature coefficient effect from the dark current offset voltage is also canceled, thereby increasing the temperature robustness of the color sensor incorporating the color sensor circuit of 200A, 200B, and 200C.

As shown in FIG. 2C, the difference operational amplifier 270 receives the output voltage VCCOUT from the color sensor output node 225 of the color sensor circuit 200A through resistor 280B at the negative input. In addition, the difference operational amplifier 270 receives the output voltage VDOUT from the color sensor output node 255 of the color sensor circuit 200B through a resistor 280C at the positive input. In addition, the positive input to the difference operational amplifier 270 is coupled to ground through another resistor 280D.

In addition, the differential amplifier circuit 200C includes a feedback resistor 280A. In FIG. 2C, the feedback resistor 280A has one end coupled to the negative input of the difference operational amplifier 270 and another end coupled to the output node 275 providing the voltage signal VCCOUT_FINAL.

The resistance values of the resistors 280A, 280B, 280C, and 280D are similar, in one embodiment. Specifically, the resistance value matches the resistance value of the respective feedback resistor component 230 of the color sensor circuit 200A that is designed to detect a respective color component.

Figure 3:
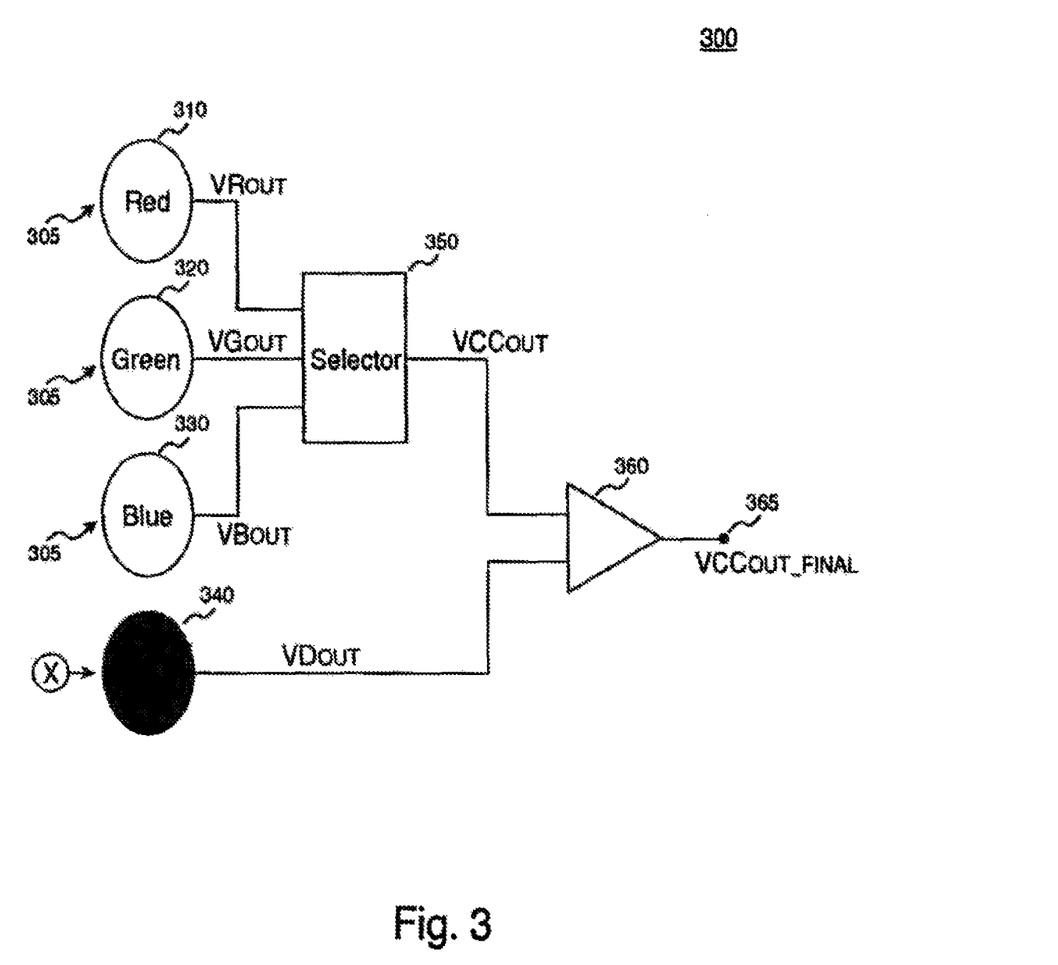
FIG. 3 is a schematic diagram of a color sensor circuit including one differential circuit for canceling dark current voltage offset, in accordance with one embodiment of the present invention.

FIG. 3 is a schematic diagram of a color sensor 300 that is capable of canceling dark current voltage offset when producing voltage of an input light energy as a measure of the intensity of a respective color component, in accordance with one embodiment of the present invention. The color sensor 300 incorporates embodiments of the present invention as disclosed in FIGS. 2A, 2B, and 2C.

The color sensor 300 includes a plurality of color sensor circuits. Each of the plurality of color sensor circuits produce photocurrent from a respective color component of an input light source 305. In addition, each of the plurality of color sensor circuits outputs an associated voltage indicating intensity of its respective color component. For example, as shown in FIG. 3, the plurality of color sensor circuits includes a red sensor circuit 310, a green sensor circuit 320, and a blue sensor circuit 330. Each of the color sensor circuits 310, 320 and 330 are configured identically as the color sensor circuit 200A, in one embodiment.

However, each of the color sensor circuits 310, 320 and 330 are designed differently to capture different wavelengths of light. For instance, the color sensor circuit 310, configured as color sensor circuit 200A, is designed to detect electromagnetic radiation from the red spectrum of the input light source 305. The color sensor circuit 310 outputs a voltage output VROUT. Also, the color sensor circuit 320, configured as color sensor circuit 200A, is designed to detect electromagnetic radiation from the green spectrum of the input light source 305. The color sensor circuit 320 outputs a voltage output VGOUT. In addition, color sensor circuit 330, configured as color sensor circuit 200A, is designed to detect electromagnetic radiation from the blue spectrum of the input light source 305. The color sensor circuit 330 outputs a voltage output VBOUT.

Each of the output voltages from the color sensor circuits 310, 320 and 330 is received by the selector 350 (e.g., multiplexor). The selector 350 selects one of the signals VROUT, VGOUT, or VBOUT to measure its intensity of a corresponding color component from the input light source 305. For example, if the selector 350 selects the VROUT, then the intensity of the red component of the input light source 305 is measured in the color sensor 300.

In addition, the color sensor 300 includes a dark color sensor circuit 340. The dark color sensor circuit 340 produces dark photocurrent and outputs a dark current offset voltage VDOUT. The dark color sensor circuit 340 is configured similarly to the color sensor circuit 200B of FIG. 2B. The dark color sensor circuit 340 converts the dark photocurrent into some form of reference offset voltage for later cancellation from the voltage outputs selected by the selector 350. As such, the dark color sensor circuit 340 produces a dark photocurrent and outputs a dark current offset voltage VDOUT that indicates the intensity of dark current.

The sensor circuit 300 includes a differential amplifier circuit 360. The differential amplifier circuit 360 is capable of canceling a contribution of the dark current offset in the output voltage VCCOUT being measured due to dark photocurrent. The differential amplifier circuit 360 is configured similarly to the differential amplifier circuit 200C of FIG. 2C. Specifically, the differential amplifier circuit 360 receives the selected voltage output VCCOUT from the selector 350 and the dark current voltage offset VDOUT from the dark color sensor circuit 340. The differential amplifier circuit 360 outputs a final output VCCOUT_FINAL at node 365 canceling contributions of the offset voltage due to dark photocurrent.

As shown in FIG. 3, since the voltage VCCOUT is essentially the voltage gain total of both the dark photocurrent and photocurrent generated by the respective color component of the input light source 305, the effect of the dark photocurrent is cancelled in the differential amplifier circuit 360. As a result, the relative temperature coefficient effect from the dark current offset voltage is also canceled, thereby increasing the temperature robustness of the color sensor 300.

As described previously, the resistor value of the resistors in the differential amplifier circuit 360 should match the resistance of the feedback resistor in the respective color sensor circuits 310, 320, or 330 from which the intensity of the respective color component is being measured. However, since there is only one differential amplifier 360, the resistance value in the differential amplifier 360 should match the resistance with the lowest resistor gain selection among the feedback resistor components in the red color sensor circuit 310, the green color sensor circuit 320, and the blue color sensor circuit 330.

The final output VCCOUT can be presented in digital form or analog form, using the proper converters, in one embodiment. This final output can be presented to a processor (e.g., microprocessor) for further processing, to include the reconstruction of the input light source 305 with the requisite VCCOUT information from each of the color components.

Figure 4:
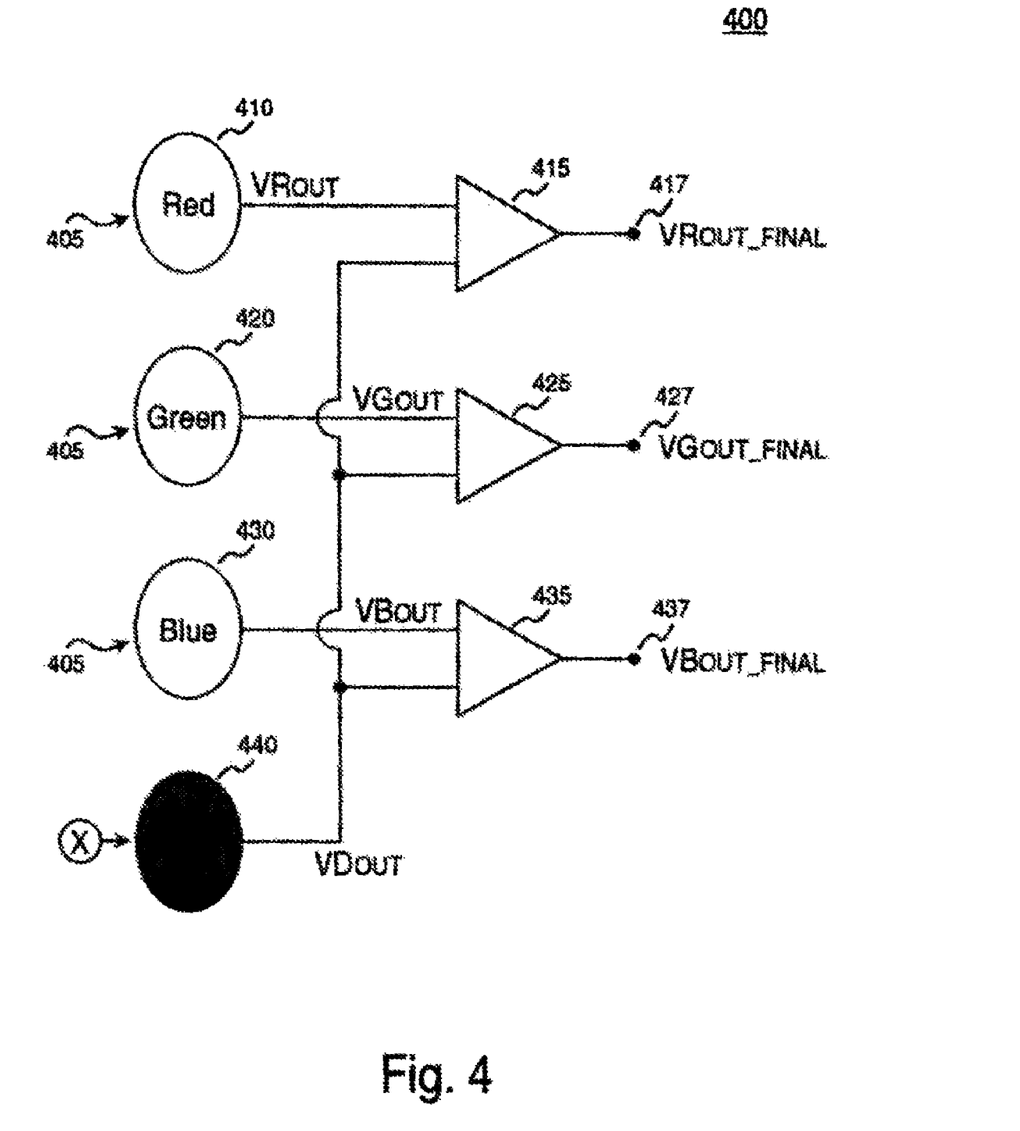
FIG. 4 is a schematic diagram of a color sensor circuit including multiple differential circuits for canceling dark current voltage offset, in accordance with one embodiment of the present invention.

FIG. 4 is a schematic diagram of a color sensor 400 that is capable of canceling dark current voltage offset when producing voltage of an input light source as a measure of the intensity of a respective color component, in accordance with one embodiment of the present invention. The color sensor 400 incorporates embodiments of the present invention as disclosed in FIGS. 2A, 2B, and 2C.

The color sensor 400 includes a plurality of color sensor circuits. Each of the plurality of color sensor circuits produces photocurrent from a respective color component of an input light source 405. In addition, each of the plurality of color sensor circuits outputs an associated voltage indicating intensity of its respective color component. For example, as shown in FIG. 4, the plurality of color sensor circuits includes a red sensor circuit 410, a green sensor circuit 420, and a blue sensor circuit 430. Each of the color sensor circuits 410, 420 and 430 are configured identically as the color sensor circuit 200A, in one embodiment.

However, each of the color sensor circuits 410, 420 and 430 is designed differently to capture different wavelengths of light. For instance, the color sensor circuit 410, configured as color sensor circuit 200A, is designed to detect electromagnetic radiation from the red spectrum of the input light source 405. The color sensor circuit 410 outputs a voltage output VROUT. Also, the color sensor circuit 420, configured as color sensor circuit 200A, is designed to detect electromagnetic radiation from the green spectrum of the input light source 405. The color sensor circuit 420 outputs a voltage output VGOUT. In addition, color sensor circuit 430, configured as color sensor circuit 200A, is designed to detect electromagnetic radiation from the blue spectrum of the input light source 405. The color sensor circuit 430 outputs a voltage output VBOUT.

In addition, the color sensor 400 includes a dark color sensor circuit 440. The dark color sensor circuit 440 produces dark photocurrent and outputs a dark current offset voltage VDOUT. The dark color sensor circuit 440 is configured similarly to the color sensor circuit 200B of FIG. 2B. The dark color sensor circuit 440 converts the dark photocurrent into some form of reference offset voltage for later cancellation from a corresponding voltage output from the color sensors 410, 420, and 430. As such, the dark color sensor circuit 440 produces a dark photocurrent and outputs a dark current offset voltage VDOUT that indicates the intensity of dark current.

The color sensor 400 also includes a plurality of differential amplifier circuits, 415, 425, and 435. Each of the plurality of differential amplifier circuits corresponds to an associated color sensor circuit in the plurality of color sensor circuits. This is to match the resistor value of resistors in the differential amplifier circuit to the resistance of the feedback resistor component in the corresponding color sensor circuit. For example, the differential amplifier circuit 415 is associated with the red color sensor circuit 410, and is designed to match resistor values in the differential amplifier circuit 415 and the red color sensor circuit 410. Also, the differential amplifier circuit 425 is associated with the green color sensor circuit 420, and is designed to match resistor values in the differential amplifier circuit 415 and the green color sensor circuit 420. In addition, the differential amplifier circuit 435 is associated with the blue color sensor circuit 430 and is designed to match resistor values in the differential amplifier circuit 415 and the blue color sensor circuit 430.

Each of the plurality of differential amplifier circuits 415, 425, and 435 is capable of canceling a contribution of the dark current offset in an associated output voltage VCCOUT being measured due to dark photocurrent. Each of the plurality of differential amplifier circuits is configured similarly to the differential amplifier circuit 200C of FIG. 2C, and outputs a final output voltage that compensates for the dark current voltage offset due to dark photocurrent.

Specifically, the differential amplifier circuit 415 receives the voltage output VROUT from the red color sensor circuit 410 and the dark current voltage offset VDOUT from the dark color sensor circuit 440. The differential amplifier circuit 415 outputs a final output VROUT_FINAL at node 417 that measures the intensity of the red component of the input light source 405. The final output VROUT_FINAL cancels contributions of the offset voltage due to dark photocurrent.

Additionally, the differential amplifier circuit 425 receives the voltage output VGOUT from the green color sensor circuit 420 and the dark current voltage offset VDOUT from the dark color sensor circuit 440. The differential amplifier circuit 425 outputs a final output VGOUT_FINAL at node 427 that measures the intensity of the green component of the input light source 405. The final output VGOUT_FINAL cancels contributions of the offset voltage due to dark photocurrent.

Also, the differential amplifier circuit 435 receives the voltage output VBOUT from the blue color sensor circuit 430 and the dark current voltage offset VDOUT from the dark color sensor circuit 440. The differential amplifier circuit 435 outputs a final output VGOUT_FINAL at node 437 that measures the intensity of the green component of the input light source 405. The final output VGOUT_FINAL cancels contributions of the offset voltage due to dark photocurrent.

The final outputs VROUT_FINAL, VGOUT_FINAL, and VBOUT_FINAL can be presented in digital form or analog form, using the proper converters, in one embodiment. These final outputs are presented to a processor (e.g., microprocessor) for further processing, to include the reconstruction of the input light source 405.

Figure 5:
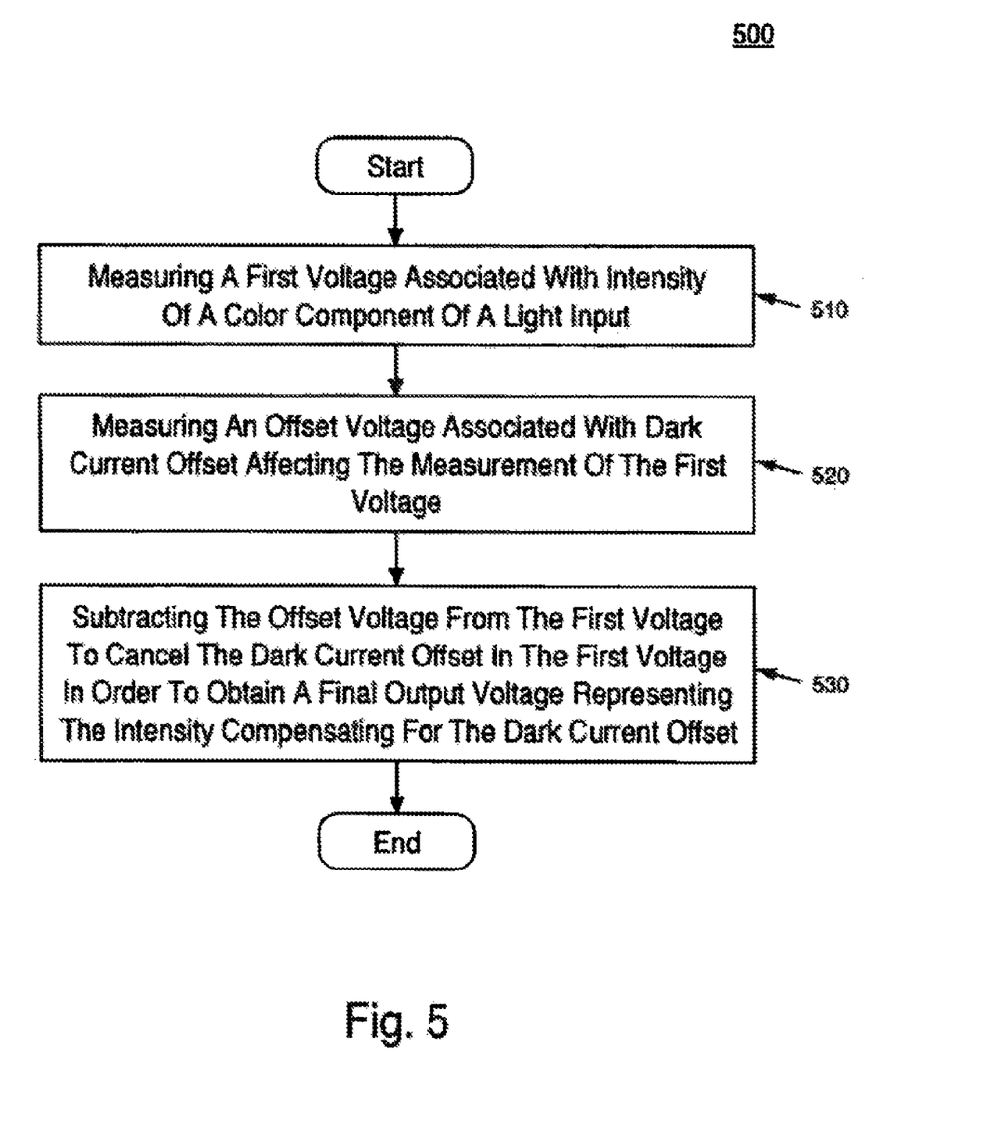
FIG. 5 is a flow diagram illustrating steps in a method for canceling dark current voltage offset in a color sensor circuit, in accordance with one embodiment of the present invention.

FIG. 5 is a flow diagram 500 illustrating steps in a method for canceling dark current offset voltage in a color sensor, in accordance with one embodiment of the present invention. The method of flow diagram 500 is capable of overcoming the problems associated with dark current voltage offset thus providing better color sensor DC response (zero offset) and increased temperature robustness in a color sensor.

At 510, the present embodiment measures a first voltage that is associated with the intensity of a color component of an input light source. The first voltage includes electromagnetic energy from the color component of the input light source and contributions from a dark current voltage offset, as previously described.

At 520, the present embodiment measures the dark current voltage offset that is associated with the dark photocurrent, or dark current offset, that is affecting the measurement of the first voltage. This is accomplished by converting the dark photocurrent. The dark current voltage offset is then used as a reference offset voltage for later cancellation from the first voltage.

At 530, the present embodiment subtracts the dark current offset voltage from the first voltage to cancel the dark current offset effects in the first voltage. As such, a final output voltage is obtained that represents the true intensity of the corresponding color component that compensates for the dark current voltage offset.

In another embodiment, the method cancels a plurality of dark current voltage offsets from a plurality of color sensor circuits. That is, the present embodiment measures a plurality of voltages associated with intensities of respective color components of an input light source. A dark current voltage offset that is associated with the dark photocurrent is also measured. The dark current voltage offset is then used as a reference offset voltage for later cancellation from each of the plurality of voltages. Then, the present embodiment subtracts the offset voltage from each of the plurality of voltages to cancel the dark current voltage offset. As such, the present embodiment obtains a plurality of final output voltages representing intensity of respective color components that each compensates for the dark current voltage offset.

While the methods of embodiments illustrated in flow chart 500 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

The preferred embodiments of the present invention, a system and method for canceling dark current voltage offset in a color sensor, are thus described. While the present invention has been described in particular embodiments, it should be appreciated that the present invention should not be construed as limited by such embodiments, but rather construed according to the below claims.

What is claimed is:

1. A color sensor configured to sense a plurality of color components of light incident thereon, comprising:

a Red color sensor circuit comprising a Red photodetector configured to receive incident light thereon and provide a Red photocurrent therefrom to a Red transimpedance amplifier as an input thereto in response to the incident light, the Red transimpedance amplifier being configured to provide a Red output voltage indicative of a Red intensity of a Red spectrum included in the incident light as the Red intensity occurs under a current operating temperature, the Red transimpedance amplifier further comprising a Red feedback resistor component arranged in parallel with a Red compensation capacitor, the Red feedback resistor component and the Red compensation capacitor having values selected to permit accurate measurement of the Red intensity, a first slope of a voltage response of the Red transimpedance amplifier not varying with temperature;

a Green color sensor circuit comprising a Green photodetector configured to receive incident light thereon and provide a Green photocurrent therefrom to a Green transimpedance amplifier as an input thereto in response to the incident light, the Green transimpedance amplifier being configured to provide a Green output voltage indicative of a Green intensity of a Green spectrum included in the incident light as the Green intensity occurs under the current operating temperature, the Green transimpedance amplifier further comprising a Green feedback resistor component arranged in parallel with a Green compensation capacitor, the Green feedback resistor component and the Green compensation capacitor having values selected to permit accurate measurement of the Green intensity, a second slope of a voltage response of the Green transimpedance amplifier not varying with temperature;

a Blue color sensor circuit comprising a Blue photodetector configured to receive incident light thereon and provide a Blue photocurrent therefrom to a Blue transimpedance amplifier as an input thereto in response to the incident light, the Blue transimpedance amplifier being configured to provide a Blue output voltage indicative of a Blue intensity of a Blue spectrum included in the incident light as the Blue intensity occurs under the current operating temperature, the Blue transimpedance amplifier further comprising a Blue feedback resistor component arranged in parallel with a Blue compensation capacitor, the Blue feedback resistor component and the Blue compensation capacitor having values selected to permit accurate measurement of the Blue intensity, a third slope of a voltage response of the Blue transimpedance amplifier not varying with temperature;

a dark color sensor circuit comprising a dark photodetector configured to provide a dark photocurrent proportional to the current operating temperature to a dark color transimpedance amplifier as an input thereto, the dark color transimpedance amplifier converting the dark photocurrent into a dark current offset voltage, the dark color transimpedance amplifier further comprising a dark feedback resistor component arranged in parallel with a dark compensation capacitor, the dark feedback resistor component and the dark compensation capacitor having values selected to permit accurate measurement of the dark photocurrent, a third slope of a voltage response of the dark color transimpedance amplifier not varying with temperature;

a multiplexer configured to receive the Red, Green and Blue output voltages as inputs thereto and to select one of the Red, Green and Blue output voltages as a selected color sensor output voltage;

a differential amplifier configured to receive the selected color sensor output voltage and the dark current offset voltage as inputs thereto and to adjust the selected color sensor output voltage using the dark current offset voltage to cancel the contribution of the dark current offset voltage and relative temperature coefficient effect corresponding thereto in the selected color sensor output voltage according to the current operating temperature and thereby provide a color sensor output signal;

wherein each of the foregoing resistor components has a value ranging between 0.5 megaohms and 200 megaohms, each of the foregoing compensation capacitors has a value ranging between 2 picofarads and 400 picofarads, and the color sensor output signal represents the true intensity of the color corresponding to the selected color sensor output voltage owing to increased temperature robustness provided by the transimpedance amplifiers.

2. The color sensor of claim 1, wherein the multiplexer selects Red as the selected color sensor output voltage.

3. The color sensor of claim 1, wherein the multiplexer selects Green as the selected color sensor output voltage.

4. The color sensor of claim 1, wherein the multiplexer selects Blue as the selected color sensor output voltage.

5. A method of compensating for fluctuations in dark current arising from changes in current operating temperature in a color sensor, comprising:

generating a Red photocurrent with a Red photodetector in response to incident light falling on the Red photodetector and providing the Red photocurrent to a Red transimpedance amplifier as an input thereto to provide a Red output voltage indicative of a Red intensity of a Red spectrum included in the incident light as the Red intensity occurs under a present operating temperature, the Red transimpedance amplifier comprising a Red feedback resistor component arranged in parallel with a Red compensation capacitor, the Red feedback resistor component and the Red compensation capacitor having values selected to permit accurate measurement of the Red intensity, a first slope of a voltage response of the Red transimpedance amplifier not varying with temperature;

generating a Green photocurrent with a Green photodetector in response to incident light falling on the Green photodetector and providing the Green photocurrent to a Green transimpedance amplifier as an input thereto and to provide a Green output voltage indicative of a Green intensity of a Green spectrum included in the incident light as the Green intensity occurs under the present operating temperature, the Green transimpedance amplifier comprising a Green feedback resistor component arranged in parallel with a Green compensation capacitor, the Green feedback resistor component and the Green compensation capacitor having values selected to permit accurate measurement of the Green intensity, a second slope of a voltage response of the Green transimpedance amplifier not varying with temperature;

generating a Blue photocurrent with a Blue photodetector in response to incident light falling on the Blue photodetector and providing the Blue photocurrent to a Blue transimpedance amplifier as an input thereto and to provide a Blue output voltage indicative of a Blue intensity of a Blue spectrum included in the incident light as the Blue intensity occurs under the present operating temperature, the Blue transimpedance amplifier comprising a Blue feedback resistor component arranged in parallel with a Blue compensation capacitor, the Blue feedback resistor component and the Blue compensation capacitor having values selected to permit accurate measurement of the Blue intensity, a third slope of a voltage response of the Blue transimpedance amplifier not varying with temperature;

generating a dark photocurrent proportional to the current operating temperature and providing the dark photocurrent to a dark color transimpedance amplifier as an input thereto, the dark color transimpedance amplifier converting the dark photocurrent into a dark current offset voltage, the dark color transimpedance amplifier further comprising a dark feedback resistor component arranged in parallel with a dark compensation capacitor, the dark feedback resistor component and the dark compensation capacitor having values selected to permit accurate measurement of the dark photocurrent, a fourth slope of a voltage response of the dark color transimpedance amplifier not varying with temperature;

providing the Red, Green and Blue output voltages as separate inputs to a multiplexer, and selecting, with the multiplexer, one of the Red, Green and Blue output voltages as a selected color sensor output voltage;

providing the selected color sensor output voltage and the dark current offset voltage as inputs to a differential amplifier;

adjusting, in the differential amplifier, the selected color sensor output voltage using the dark current offset voltage to cancel the contribution of the dark current offset voltage and relative temperature coefficient effect corresponding thereto in the selected color sensor output voltage according to the current operating temperature and thereby provide a color sensor output signal;

wherein each of the foregoing resistor components has a value ranging between 0.5 megaohms and 200 megaohms, each of the foregoing compensation capacitors has a value ranging between 2 picofarads and 400 picofarads, and the color sensor output signal represents the true intensity of the color corresponding to the selected color sensor output voltage owing to increased temperature robustness provided by the transimpedance amplifiers.

6. The method of claim 5, wherein the multiplexer selects Red as the selected color sensor output voltage.

7. The method of claim 5, wherein the multiplexer selects Green as the selected color sensor output voltage.

8. The method of claim 5, wherein the multiplexer selects Blue as the selected color sensor output voltage.

* * * * *